(12) United States Patent
Cho et al.

(10) Patent No.: US 8,768,680 B2
(45) Date of Patent: Jul. 1, 2014

(54) SIMULATOR OF MULTI-CORE SYSTEM EMPLOYING RECONFIGURABLE PROCESSOR CORES AND METHOD OF SIMULATING MULTI-CORE SYSTEM EMPLOYING RECONFIGURABLE PROCESSOR CORES

(75) Inventors: Young-Chul Cho, Yongin-si (KR); Soo-Jung Ryu, Hwaseong-si (KR); Yoon-Jin Kim, Seoul (KR); Woong Seo, Hwaseong-si (KR); Il-Hyun Park, Yongin-si (KR); Tae-Wook Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 13/006,730

(22) Filed: Jan. 14, 2011

(65) Prior Publication Data

US 2011/0218795 A1 Sep. 8, 2011

(30) Foreign Application Priority Data

Mar. 3, 2010 (KR) ........................ 10-2010-0019154

(51) Int. Cl.
*G06F 17/50* (2006.01)
(52) U.S. Cl.
CPC ........ *G06F 17/5045* (2013.01); *G06F 17/5022* (2013.01); *G06F 2217/68* (2013.01)
USPC .............................. 703/21; 716/116; 716/117
(58) Field of Classification Search
USPC ........... 703/1, 21, 26; 716/101, 106, 116, 117
See application file for complete search history.

(56) References Cited

U.S. PATENT DOCUMENTS

| | | | | |
|---|---|---|---|---|
| 6,002,861 A * | 12/1999 | Butts et al. | ...................... | 703/16 |
| 7,313,773 B1 | 12/2007 | Braun et al. | | |
| 7,650,273 B2 * | 1/2010 | Gabor et al. | ..................... | 703/21 |
| 2004/0010401 A1 * | 1/2004 | Davis et al. | ...................... | 703/14 |
| 2004/0111248 A1 * | 6/2004 | Granny et al. | .................. | 703/22 |
| 2005/0165597 A1 * | 7/2005 | Nightingale | .................... | 703/27 |

(Continued)

FOREIGN PATENT DOCUMENTS

| | | |
|---|---|---|
| JP | 2007-226375 | 9/2007 |
| KR | 10-2000-0051795 | 8/2000 |
| KR | 10-0813662 | 3/2008 |
| KR | 10-2008-0109266 | 12/2008 |

OTHER PUBLICATIONS

Monchiero, Matteo, et al. "How to Simulate 1000 Cores" HP Labs, presented at dasCMP 2008 (Nov. 2008) available from <http://www.hpl.hp.com/techreports/2008/HPL-2008-190. html>.*

(Continued)

*Primary Examiner* — Mary C Jacob
*Assistant Examiner* — Jay B Hann
(74) *Attorney, Agent, or Firm* — NSIP Law (57) ABSTRACT

Provided are a simulator of a multi-core system employing reconfigurable processor (RP) cores and a method of simulating a multi-core system employing RP cores. The simulator includes a structure builder to receive a structure definition file defining a structure of a system, select components described in the structure definition file from a component library, and fill a data structure with the selected components to generate a structure model of a multi-core system, and a simulation engine to execute an application program according to the structure model and output the result.

20 Claims, 4 Drawing Sheets

(56) References Cited

U.S. PATENT DOCUMENTS

| | | | |
|---|---|---|---|
| 2006/0031814 A1* | 2/2006 | Morin | 717/104 |
| 2006/0218512 A1* | 9/2006 | Arslan et al. | 716/4 |
| 2006/0259878 A1* | 11/2006 | Killian et al. | 716/1 |
| 2008/0120493 A1 | 5/2008 | Yoo et al. | |
| 2009/0234620 A1* | 9/2009 | Kanazawa | 703/1 |

OTHER PUBLICATIONS

Petrov M. et al. "The XPP Architecture and Its Co-simulation Within the Simulink Environment" Lecture Notes in Computer Science, vol. 3203, pp. 761-770 (2004) available from <http://www.springerlink.com/content/v64tj2lq3amad0cn/>.*

Amano, Hideharu, et al. "MuCCRA chips: Configurable Dynamically-Reconfigurable Processors" IEEE Asian Solid-State Circuits Conference (Nov. 2007).*

Yu, Zhibin, et al. "A Simulation Times Model of Multi-core Simulation" IEEE World Congress on Software Engineering (2009).*

Tunbunheng, Vasutan; Amano, Hideharu "Black-Diamond: a Retargetable Compiler using Graph with Configuration Bits for Dynamically Reconfigurable Architectures" in SASIMI Proceedings (R4-12), pp. 412-419 (Oct. 2007) available from <http://www.am.ics.keio.ac.jp/members/hunga/muccra/papers/vasutan_sasimi_2007.pdf>.*

* cited by examiner

SIMULATOR OF MULTI-CORE SYSTEM EMPLOYING RECONFIGURABLE PROCESSOR CORES AND METHOD OF SIMULATING MULTI-CORE SYSTEM EMPLOYING RECONFIGURABLE PROCESSOR CORES

CROSS REFERENCE TO RELATED APPLICATION

This application claims the benefit under 35 U.S.C. §119(a) of Korean Patent Application No. 10-2010-0019154, filed on Mar. 3, 2010 in the Korean Intellectual Property Office, the entire disclosure of which is incorporated herein by reference for all purposes.

BACKGROUND

1. Field

The following description relates to a simulator of a multi-core system employing reconfigurable processor (RP) cores and a method of simulating a multi-core system employing RP cores, and more particularly, to a simulator and method of simulating a multi-core system is while dynamically configuring a multi-core structure.

2. Description of the Related Art

A multi-core system includes two or more processor cores capable of performing different tasks at the same time. Such a system appropriately distributes the load of tasks of applications suitable for parallel processing to a plurality of processor cores, thereby obtaining improved performance. Through parallel processing, a multi-core system can obtain the same amount of improvement in performance as a single core system at lower cost.

In comparison with a single core system, a multi-core system requires more components, such as processor cores, memories, direct memory accesses (DMAs), interrupt controllers (ITCs), and timers, and connections between respective components are more complicated. Thus, it is important to determine the structure of a multi-core system to improve the performance of the overall system and reduce the power consumption.

One method of determining the structure of a multi-core system may be to depend on the intuition of a skilled engineer. That is, the most suitable structure of a multi-core system may be determined by the experience of an engineer. However, when designed performance and power consumption are not achieved in this method, it is difficult to analyze and solve this problem.

In another method of determining the structure of a multi-core system, components registered in a library are selected, and code representing characteristics and functionality of the components is generated in the C/C++ language. The generated code is compiled, and a simulator is generated to execute the compiled code. Here, the generated simulator can simulate only a fixed structure.

To simulate a modified structure of the multi-core system, several steps need to be performed again, and considerable time is required. Thus, it is necessary to establish an is environment in which a multi-core system can be simulated while modifying the structure of the system.

SUMMARY

The following description relates to a simulator and method of simulating a multi-core system while automatically changing the structural arrangement of the multi-core system to improve the performance of the multi-core system.

The foregoing and/or other features and aspects may be achieved by providing a simulator of a multi-core system employing reconfigurable processor cores, including a structure builder to receive a structure definition file defining a structure of a system, select components described in the structure definition file from a component library, and fill a data structure stored in the simulator in advance with the selected components to generate a structure model of a multi-core system, and a simulation engine to execute an application program according to the structure model and output a result.

Component information compiled in advance may be stored in the component library.

The structure definition file may define a plurality of system structures.

The structure definition file may be in an extensible markup language (XML) format.

The simulator may further include an performance analyzer to analyze performance of the multi-core system using the result obtained from the simulation engine.

The performance analyzer may determine whether the simulation result of the multi-core system satisfies a performance condition set in advance, and a new structure definition file may be input to the structure builder during a run-time of the simulator in response to the simulation result not satisfying the performance condition.

The simulation engine may execute a plurality of application programs according to the structure model of the same multi-core system to simulate the structure model.

The foregoing and/or other features and aspects may also be achieved by providing a is method of simulating a multi-core system employing reconfigurable processor cores, the method including receiving a structure definition file defining a structure of a system, selecting components corresponding to the structure definition file from a component library, filling a data structure stored in a simulator in advance with the selected components to generate a structure model of a multi-core system, and executing an application program according to the structure model to output a result.

Component information compiled in advance may be stored in the component library.

The structure definition file may define a plurality of system structures.

The structure definition file may be in an XML format.

The method mazy further include analyzing performance of the multi-core system using the output result.

The analyzing of the performance of the multi-core system may include determining at a performance analyzer whether the result of simulating the multi-core system satisfies a performance condition set in advance, and receiving at a structure builder a new structure definition file during a run-time of the simulator in response to the simulation result not satisfying the performance condition.

The executing of the application program may include executing a plurality of application programs according to the structure model of the same multi-core system to simulate the structure model.

The foregoing and/or other features and aspects may also be achieved by providing a method of simulating a multi-core system employing reconfigurable processor cores, the method including selecting components from a component library according to a structure definition file, generating a structure model by employing the selected components in a previously stored data structure, and simulating an application program according to the structure model.

Other features and aspects will become apparent from the following detailed description, is the drawings, and the claims.

BRIEF DESCRIPTION OF THE DRAWINGS

These and/or other aspects will become apparent and more readily appreciated from the following description of various example embodiments, taken in conjunction with the accompanying drawings briefly described below.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
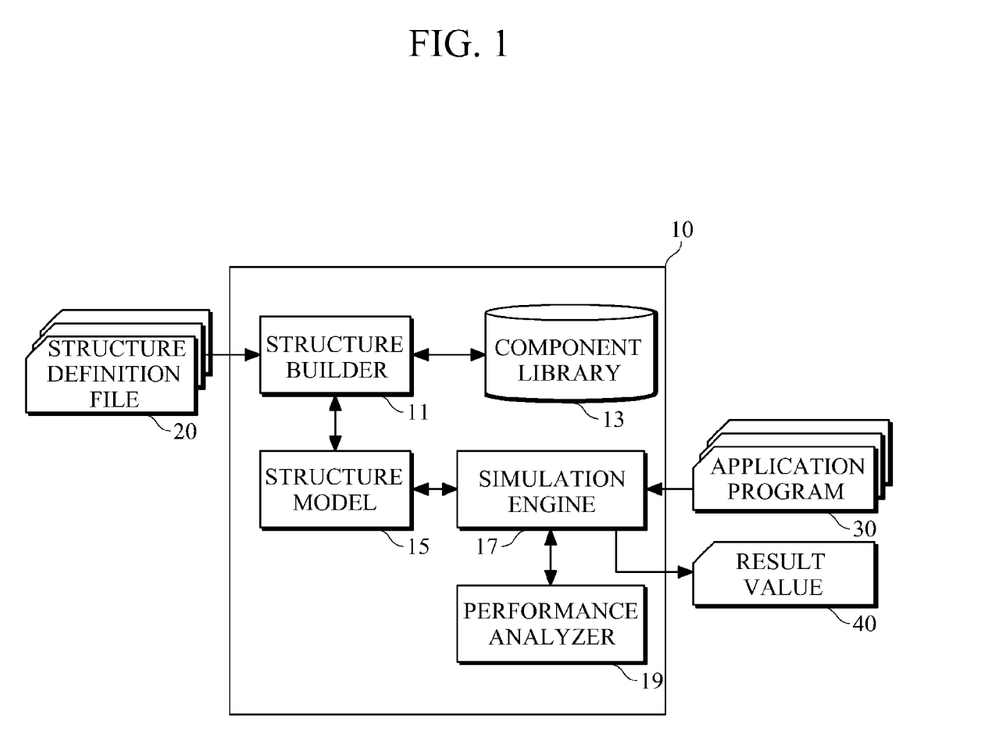
FIG. 1 is a block diagram illustrating an example simulator.

FIG. 1 is a block diagram illustrating an example simulator 10. Referring to FIG. 1, the simulator 10 may include a structure builder 11, a component library 13, a structure model 15, a simulation engine 17, and a performance analyzer 19.

The structure builder 11 may include an interface controller and a memory in which a data structure is stored. The structure builder 11 may receive a data file of the structural arrangement of a multi-core system in the extensible markup language (XML) format, but is not limited to such a format. In a structure definition file 20, respective components of the multi-core system can be schematically expressed. Thus, after the structure definition file 20 is received, the structure builder 11 may obtain information about the configuration and arrangement of respective components and information about an interface state.

For example, the information may include the number and arrangement of processor cores, memories, direct memory accesses (DMAs), interrupt controllers (ITCs), timers, and the like. Also, the information may include information about an interface between respective components. Using a file in the XML format, it is possible to know the arrangement of the multi-core system without a decoding process. Once the structural arrangement of the system is found, the structure builder 11 may specify respective components with reference to the component library 13 through a controller.

The structure definition file 20 may be plural in number. A user may experimentally set several structures in advance and store the structures in the XML format. Then, the structure definition file 20 desired to simulate various structures of the multi-core system can be input. The structure builder 11 may fill a data structure previously set in the simulator 10 with the specified components. The previously set data structure may be, for example, a tree-shaped data structure. In this way, the final structure model 15 of the multi-core system may be generated.

Various components employed in multi-core systems may be compiled and stored in the component library 13. Thus, when a signal is input from the structure builder 11, it is possible is to specify a component corresponding to the signal at any time. The types of components stored in the component library 13 can be set in advance. As information on respective components, for example, reconfigurable processor (RP) cores may store the power consumptions and data processing speeds of a direct memory access controller (DMAC), a configuration memory, a cache, an interface, and the like.

Meanwhile, a new component or interface can be set in the component library 13. Since compiled components are stored in the component library 13, the new component may undergo a compiling process. When the data structure is filled with specified components, the compiling process is not required to be performed, and a simulation process can be simplified. The process of filling the data structure stored in the simulator 10 in advance with specified components will be described in more detail later in this description.

The structure model 15 may be completed by filling the above-mentioned data structure with components specified from the component library 13. The structure model 15 may be output by the structure builder 11. The structure model 15 can be directly simulated by the simulation engine 17 without a compiling process, and thus the simulation speed can be increased. In particular, when a simulation is repeated, a difference in simulation speed may matter more. By filling the above-mentioned tree-shaped data structure with the components of the multi-core system, the structure model 15 can be completed.

The simulation engine 17 may simulate the structure model 15 generated by the structure builder 11. The purpose of the simulation may be, for example, to determine the power consumption, data processing speed, etc., of the overall multi-core system. After finishing the simulation, the simulation engine 17 may output a result value 40. As mentioned above, the result value 40 may indicate the power consumption, data processing speed, etc., of the multi-core system.

The performance analyzer 19 may receive the simulation result value 40 from the is simulation engine 17. The performance analyzer 19 may analyze the result value 40 and determine whether or not the result value 40 satisfies a set condition. To this end, it may be desired that a simulation target be determined first. For example, the number of central processing units (CPUs) and the number of caches among components of the multi-core system may be determined in advance. According to the limited components, the power consumption and/or data processing speed may be determined. In a case in which the simulation result value 40 satisfies the set condition, the performance analyzer 19 may determine the current structure model 15 as a final value. In a case in which the simulation result value 40 of the current structure model 15 does not satisfy the set condition, the performance analyzer 19 may generate a signal to modify the structure the multi-core system. This will be described in more detail later with reference to FIG. 3.

Application programs 30 may be various operating systems (OSs), executable programs, and so on. Thus, such a program may be executed in the structure model 15 of the multi-core system to simulate the structure model 15. When a specific program is executed, it is possible to know the power consumption, data processing speed, etc., of the multi-core system. Thus, the user of the simulator 10 can determine whether an application program 30 may be optimally running in a specific multi-core system structure.

The simulator 10 may output the result value 40 indicating the result of the simulation. The result value 40 may indicate the power consumption, data processing speed, etc., of the multi-core system having a specific structural arrangement. Even if an application program 30 is changed on the basis of the same structural arrangement of the multi-core system, the result value 40 may indicate the result of executing each application program that has been used in the simulation.

Figure 2A:
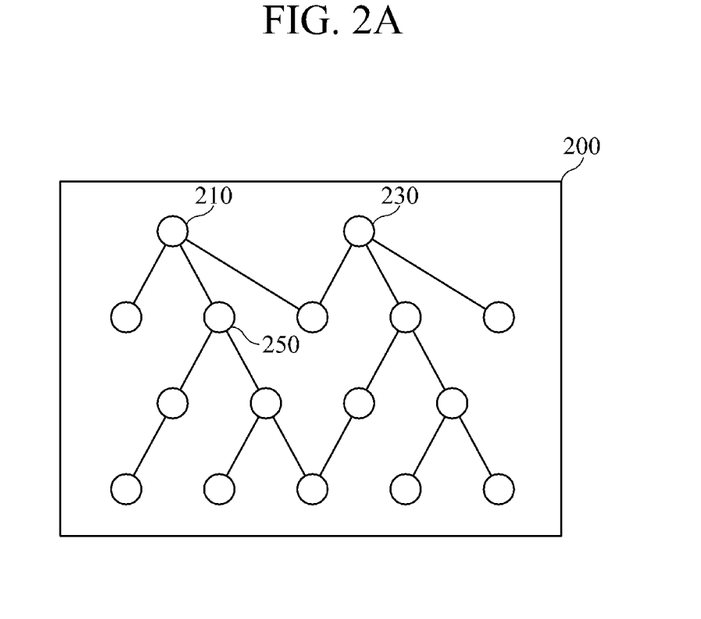
FIG. 2A is a diagram illustrating a data structure stored in an example simulator before components are arranged in the data structure.
Figure 2B:
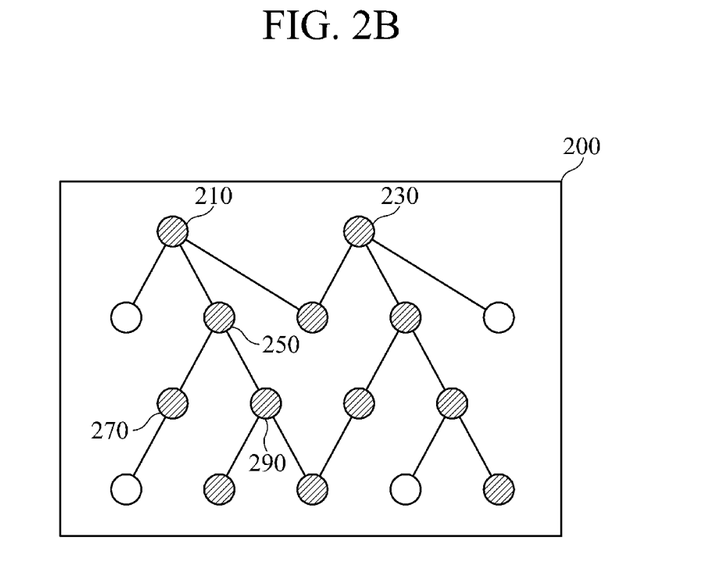
FIG. 2B is a diagram illustrating a data structure stored in an example simulator and in which components are arranged.

FIG. 2A is a diagram illustrating a data structure stored in an example simulator before components are arranged in the data structure, and FIG. 2B is a diagram illustrating a data is structure stored in an example simulator and in which components are arranged.

As illustrated in FIG. 2A, a data structure 200 may be stored without being filled with data. Data about each component is specified, and the data structure 200 is filled with the data. For example, each of RP cores 210 and 230 may be connected with a DMAC 250, a configuration memory, and a cache, and the DMAC 250 may be connected with, for example, a scratchpad memory (SPM) and a DMA. In the event that the disposition or connections of respective components are changed, arrangement in the data structure 200 may vary.

The data structure 200 may be set in various forms. As mentioned above, the full data structure 200 does not have to be used to simulate a multi-core system. In other words, the data structure 200 does not have to be filled with all specified components. Thus, the user of the simulator 10 can simulate various structure models of a multi-core system.

Referring to FIG. 2B, the above-described data structure 200 can be used to implement a multi-core digital signal processor (DSP) sub-system employing RP cores. When the two RP cores 210 and 230 are used, the two RP cores 210 and 230 may be disposed in the uppermost layer and connected with, for example, the DMAC 250, a configuration memory, and a cache in lower layers. For example, the DMAC 250 may be connected with a DMA 270 and an SPM 290 in lower layers. Also, the DMAC 250 and a DMAC of another RP core may be connected with the same external system bus.

Figure 3:
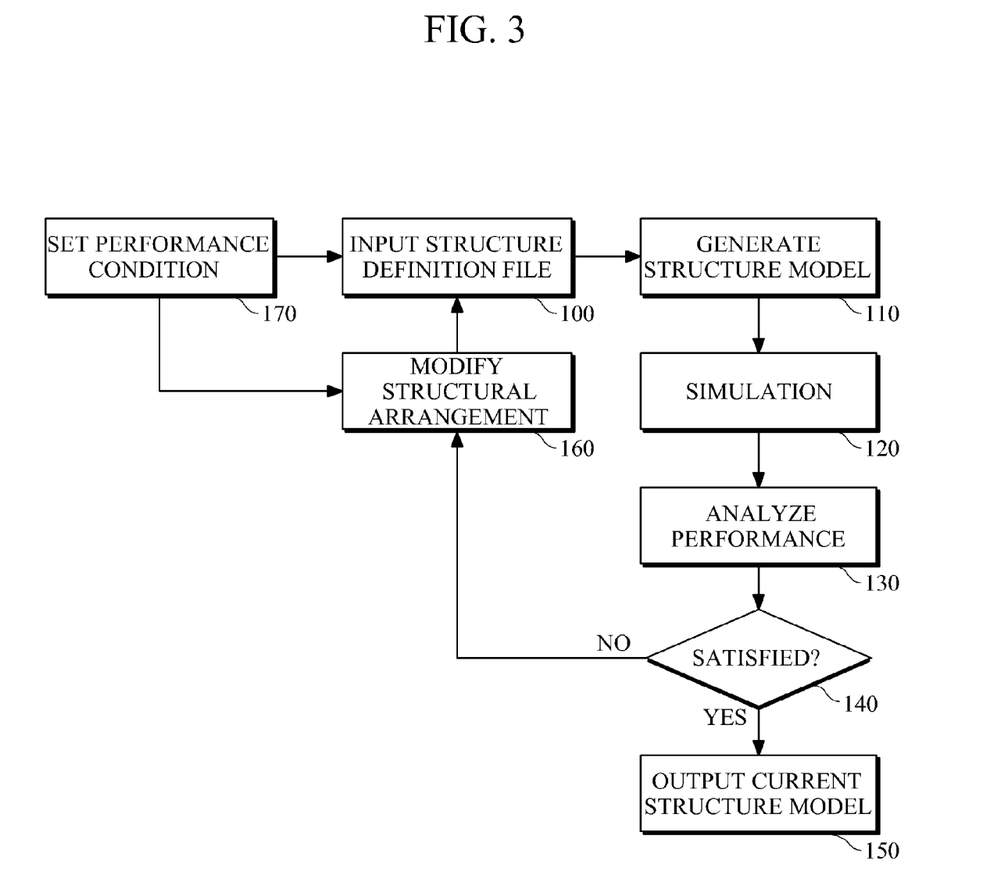
FIG. 3 illustrates an operational flowchart of an example simulator.

FIG. 3 illustrates an operational flowchart of an example simulator.

Referring to FIG. 3, the simulator may receive a structure definition file (operation 100) and may generate a structure model (operation 110). Subsequently, the simulator may simulate the generated structure model (operation 120). In a case in which a simulation result value 40 satisfies a performance condition which may be set in operation 170, the simulator may output the current structure model (operation 150). On the other hand, in a case in which the simulation result value 40 does not satisfy the set condition, a performance analyzer may output is a signal to modify the structural arrangement.

The simulator may modify the structural arrangement of a multi-core system with reference to the set condition (operation 160). The set performance condition may limit the number or arrangement of components. Then, the structure definition file may be generated in a data format indicating a structural arrangement which satisfies the set condition using the limited number of components. The generated structure definition file may be input to a structure builder again and be submitted to the above-described simulation process.

Also, a structure definition file indicating a modified structure of a multi-core system may be input during a run-time of the simulator. Input of the structure definition file may increase the speed at which a user simulates various multi-core structures to obtain set performance. A conventional simulation method must finish simulating one fixed structure of a multi-core system before simulating a new structure. Conversely, during a run-time of the example simulator for a currently input multi-core system structure described herein, a new system structure may be input during the simulation of another system structure.

Figure 4:
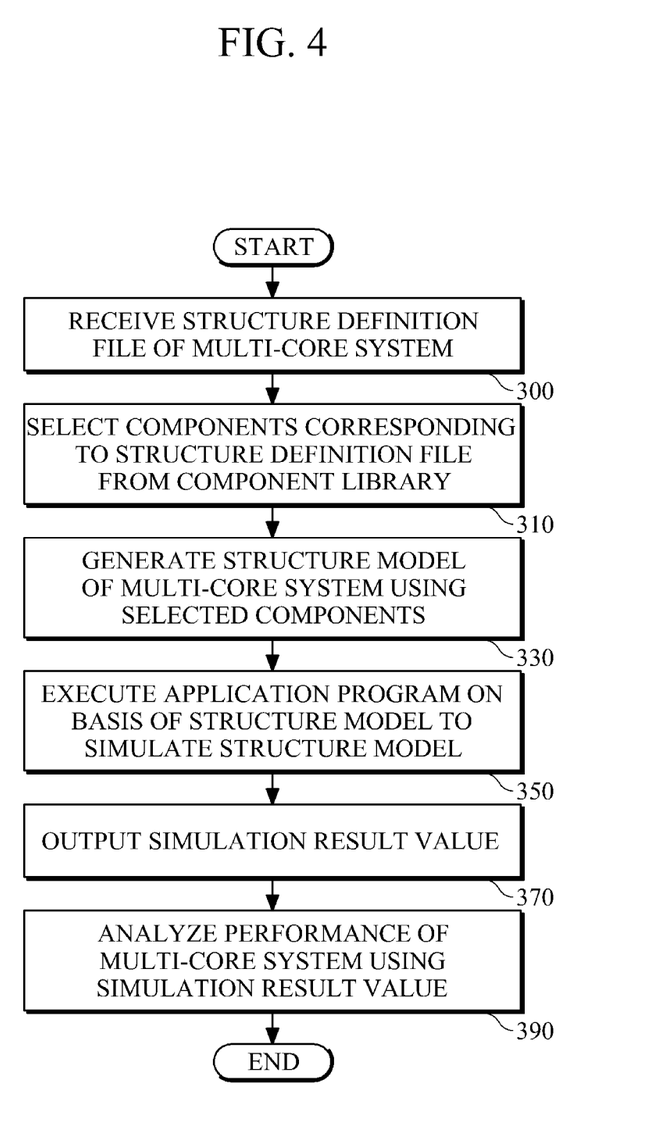
FIG. 4 is a flowchart illustrating an example simulation method.

FIG. 4 is a flowchart illustrating an example simulation method.

In an operation of receiving a structure definition file (operation 300), the structure definition file need not be one in number, and a random one of a plurality of structure definition files may be received. The structure definition file may be in the XML format. When a plurality of multi-core system structures are simulated, it may be effective to receive structure definition files during the run-time of the simulation.

Subsequently, respective components corresponding to the received file may be selected from a component library (operation 310). This may be performed after configuration information and arrangement information on the components is obtained by analyzing data in the XML format. In the component library, specified components are stored as mentioned above. This component selection process does not require a compiling process, and thus may be effective.

Subsequently, a data structure may be filled with the specified components (operation 330). At this time, the data structure may be filled with the components in order of the uppermost layer to lower layers beginning with indispensable components. For example, in a data structure, the uppermost layer may be filled with at least one component, and a lower layer may be filled with at least three components. In this way, a final structure model may be generated. Even if the arrangement of a multi-core system is changed, the data structure may not be required to be changed. Thus, it is easy to simulate a plurality of multi-core system arrangements.

Subsequently, the final structure model may be simulated by a simulation engine (operation 350). The simulation may be performed with respect to performance requirements set in advance. For example, in a case in which a first core and second core are connected to an external system bus, data regarding data processing speed and power consumption may be obtained. When the simulation is finished, a result value may be output (operation 370).

In another example simulation method, performance of the multi-core system may be analyzed using the simulation result value (operation 390). On the basis of such performance analysis, the structure of a multi-core system may be changed to exhibit the best performance. In a case in which a desired system performance is not obtained by analyzing the result of the simulation, an attempt may be made to modify the multi-core system structure. Such a modification may be performed within the limit of component configuration set in advance. The configuration limit may be, for example, that the number of cores among components must be three or less, a local bus must be connected with direct memory access controller (DMAC) and DMA, etc.

The structure of the multi-core system can also be modified by a process of selecting one or more structure definition files stored in advance. A structure definition file about structures which can be arranged within the limit of component configuration may be stored. Thus, a is structure builder may receive the non-simulated structure definition file. Using the modified structure definition file, a structure model may be generated and simulated according to the above-described method.

In still another example simulation method, an application program executed by the final structure model may be changed. The application program executed during a simulation may be various operating systems or executable programs. In a case in which a specific program is executed, it is possible to know the power consumption or data processing speed of the multi-core system. Thus, a user of a simulator can determine an application program optimally running in a specific multi-core system structure.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and is executed in a decentralized manner.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A simulator of a multi-core system employing reconfigurable processor cores, comprising:
   a data structure stored in a memory of the simulator;
   a structure builder configured to receive a structure definition file defining arrangement information of components of a multi-core system to be simulated, select at least a portion of the components described in the structure definition file from a component library based on the arrangement information of the components in the multi-core system, and fill the data structure that is stored in the simulator in advance of the receiving of the structure definition file, with the selected components to generate a structure model of the multi-core system,
   wherein the data structure stored in advance includes a nodal structure comprising a plurality of nodes that are interconnected, and the structure definition file provides data about each of the selected components that populate the nodes of the nodal structure to generate the structure model; and
   a simulation engine to execute an application program according to the structure model and output a result.

2. The simulator of claim 1, wherein component information compiled in advance is stored in the component library.

3. The simulator of claim 1, wherein the structure definition file defines a plurality of system structures.

4. The simulator of claim 1, wherein the structure definition file is in an extensible markup language (XML) format.

5. The simulator of claim 1, further comprising a performance analyzer to analyze performance of the multi-core system using the result obtained from the simulation engine.

6. The simulator of claim 5, wherein the performance analyzer determines whether the simulation result of the multi-core system satisfies a performance condition set in advance, and
   a new structure definition file is input to the structure builder during a run-time of the simulator in response to the simulation result not satisfying the performance condition.

7. The simulator of claim 1, wherein the simulation engine executes a plurality of application programs according to the structure model of the same multi-core system to simulate the structure model.

8. The simulator of claim 1, wherein the nodal structure of the data structure stored in advance in the simulator is configured to be filled with the selected components such that two or more nodes of the nodal structure represent a reconfigurable core, and at least one node represents a direct memory access controller (DMAC), and the two or more nodes representing the reconfigurable core are connected to the node representing the at least one DMAC.

9. The simulator of claim 1, wherein the structure builder is configured to fill the data structure that is stored in advance of receiving the structure definition file by populating a portion of the plurality of the nodes without populating all of the plurality of the nodes, based on the number and types of components in the multi-core system to be simulated as provided by the structure definition file.

10. A method of simulating a multi-core system employing reconfigurable processor cores, the method comprising:
    receiving a structure definition file defining arrangement information of components of a multi-core system to be simulated;
    selecting at least a portion of the components corresponding to the structure definition file from a component library by on the arrangement information;
    filling a data structure stored in a memory of a simulator in advance of the receiving of the structure definition file, with the selected components to generate a structure model of the multi-core system,
    wherein the data structure stored in advance includes a nodal structure comprising a plurality of nodes that are interconnected, and the structure definition file provides data about each of the selected components that populate the nodes in the nodal structure to generate the structure model; and
    executing an application program according to the structure model to output a result.

11. The method of claim 10, wherein component information compiled in advance is stored in the component library.

12. The method of claim 10, wherein the structure definition file defines a plurality of system structures.

13. The method of claim 10, wherein the structure definition file is in an extensible markup language (XML) format.

14. The method of claim 10, further comprising analyzing performance of the multi-core system using the output result.

15. The method of claim 14, wherein the analyzing of the performance of the multi-core system includes determining at a performance analyzer whether the result of simulating the multi-core system satisfies a performance condition set in advance, and receiving at a structure builder a new structure definition file during a run-time of the simulator in response to the simulation result not satisfying the performance condition.

16. The method of claim 10, wherein the executing of the application program includes executing a plurality of application programs according to the structure model of the same multi-core system to simulate the structure model.

17. The method of claim 10, wherein the nodal structure of the data structure stored in advance in the simulator is configured to be filled with the selected components such that two or more nodes of the nodal structure represent a reconfigurable core, and at least one node represents a direct memory access controller (DMAC), and two or more nodes representing the reconfigurable core are connected to the node representing the at least one DMAC.

18. A method of simulating a multi-core system employing reconfigurable processor cores, the method comprising:
    selecting components from a component library according to arrangement information of the components in a system to be simulated as defined in a structure definition file;
    generating a structure model by employing the selected components in a data structure stored in a memory of a simulator in advance of receiving the structure definition file; and
    simulating an application program according to the structure model,
    wherein the previously stored data structure includes a nodal structure comprising a plurality of nodes that are interconnected, and the structure definition file provides data about each of the selected components that populate the nodes in the nodal structure to generate the structure model.

19. A simulator of a multi-core system employing reconfigurable processor cores, comprising:
    a nodal data structure stored in a memory of a simulator;
    a structure builder configured to:
        receive a structure definition file defining arrangement information of components of a multi-core system to be simulated;
        obtain the arrangement information from the structure definition file;
        fill nodes of the nodal data structure, the modal data structure being stored in the memory prior to the obtaining of the arrangement information, based on the obtained arrangement information to generate a structure model; and
    a simulation engine configured to execute an application program according to the structure model.

20. The simulator of claim 19, wherein the nodal data structure is a tree-shaped nodal data structure, and the filling of the nodal data structure involves populating a portion of the nodes of the tree-shaped nodal data structure with data about the components of the multi-core system.

* * * * *